(12) United States Patent
Wang et al.

(10) Patent No.: US 11,194,099 B2
(45) Date of Patent: Dec. 7, 2021

(54) SILICON-BASED OPTICAL ANTENNA WITH REFLECTIVE LAYER AND PREPARATION METHOD THEREFOR

(71) Applicant: VANJEE TECHNOLOGY CO., LTD., Beijing (CN)

(72) Inventors: Pengfei Wang, Beijing (CN); Yang Xu, Beijing (CN); Zhaosong Li, Beijing (CN); Zhibo Li, Beijing (CN); Yejin Zhang, Beijing (CN); Hongyan Yu, Beijing (CN); Jiaoqing Pan, Beijing (CN); Qingfei Wang, Beijing (CN); Linyan Tian, Beijing (CN)

(73) Assignee: VANJEE TECHNOLOGY CO., LTD., Beijing (CN)

( * ) Notice: Subject to any disclaimer, the term of this patent is extended or adjusted under 35 U.S.C. 154(b) by 34 days.

(21) Appl. No.: 16/826,156

(22) Filed: Mar. 20, 2020

(65) Prior Publication Data

US 2020/0218012 A1    Jul. 9, 2020

Related U.S. Application Data

(63) Continuation of application No. PCT/CN2018/089663, filed on Jun. 1, 2018.

(30) Foreign Application Priority Data

Sep. 22, 2017 (CN) .......................... 201710867297.5

(51) Int. Cl.
*G02B 6/34* (2006.01)
*G01S 7/481* (2006.01)
*G02B 6/136* (2006.01)

(52) U.S. Cl.
CPC .............. *G02B 6/34* (2013.01); *G01S 7/4811* (2013.01); *G02B 6/136* (2013.01)

(58) Field of Classification Search
CPC ...... G01S 7/481; G01S 7/4811; G01S 7/4815; G01S 7/4817; G01S 7/484; G02B 6/12;
(Continued)

(56) References Cited

U.S. PATENT DOCUMENTS

2002/0092824 A1    7/2002    Sun
2004/0184732 A1    9/2004    Zhou
(Continued)

FOREIGN PATENT DOCUMENTS

CN    1485629 A    3/2004
CN    102692682 A    9/2012
(Continued)

OTHER PUBLICATIONS

"One-Dimensional Off-Chip Beam Steering and Shaping Using Optical Phased Arrays on Silicon-on-Insulator" Karel Van Acoleyen, Katarzyna Komorowska, Wim Bogaerts, Roel Baets Journal of Lightwave Technology, vol. 29, No. 23, pp. 3500-3505, Dec. 1, 2011.*

(Continued)

*Primary Examiner* — Michael P Mooney
(74) *Attorney, Agent, or Firm* — J.C. Patents

(57) ABSTRACT

Embodiments of the present disclosure provide a silicon-based optical antenna with a reflective layer and a preparation method therefor. The silicon-based optical antenna comprises: an SOI substrate, the SOI substrate at least comprises a bottom silicon layer, a buried oxide layer, and a top silicon layer, the buried oxide layer is located between the bottom silicon layer and the top silicon layer, the top silicon layer is etched to form a row of waveguides, spacings between the waveguides in the row of the waveguides are in an uneven distribution, each waveguide of the row of the waveguides is etched with gratings, the bottom silicon layer is formed with a groove directly reaching a surface of the (Continued)

buried oxide layer facing the bottom silicon layer, and the surface of the buried oxide layer in the groove is formed with a metal reflective layer.

13 Claims, 4 Drawing Sheets

(58) Field of Classification Search
CPC .......... G02B 6/12009; G02B 6/12061; G02B 6/12107; G02B 6/12133; G02B 6/136; G02B 6/34
USPC .......................................................... 385/37
See application file for complete search history.

(56) References Cited

U.S. PATENT DOCUMENTS

| | | |
|---|---|---|
| 2009/0290837 A1 | 11/2009 | Chen et al. |
| 2013/0209026 A1 | 8/2013 | Doany |
| 2013/0301981 A1 | 11/2013 | Li et al. |
| 2018/0188452 A1* | 7/2018 | Sun ..................... G01S 7/4817 |
| 2019/0033522 A1* | 1/2019 | Baba ..................... G01N 21/49 |

FOREIGN PATENT DOCUMENTS

| | | |
|---|---|---|
| CN | 103688428 A | 3/2014 |
| CN | 104570208 A | 4/2015 |
| CN | 105607186 A | 5/2016 |
| CN | 106461864 A | 2/2017 |
| CN | 106814425 A | 6/2017 |
| EP | 2 703 858 A1 | 3/2014 |
| GN | 102439403 A | 5/2012 |
| GN | 1488957 A | 4/2014 |
| WO | 2016152811 A1 | 9/2016 |

OTHER PUBLICATIONS

Notice of Allowance of the priority China application No. 201710867297.5.
The Chinese International Search Report of corresponding International application No. PCT/CN2018/089663, dated Jul. 18, 2018.
The Chinese First Examination Report of corresponding Chinese application No. 201710867297.5, dated Jul. 31, 2019.
The Chinese First Examination Report of corresponding Chinese application No. 201710867297.5, dated Feb. 27, 2020.

* cited by examiner

SILICON-BASED OPTICAL ANTENNA WITH REFLECTIVE LAYER AND PREPARATION METHOD THEREFOR

CROSS-REFERENCE TO RELATED APPLICATION

The patent application is a continuation of International application No. PCT/CN2018/089663, filed on Jun. 1, 2018, entitled "SILICON-BASED OPTICAL ANTENNA WITH REFLECTIVE LAYER AND PREPARATION METHOD THEREFORE", which claims the priority of Chinese application No. 201710867297.5, filed to China National Intellectual Property Administration on Sep. 22, 2017, entitled "SILICON-BASED OPTICAL ANTENNA WITH REFLECTIVE LAYER AND PREPARATION METHOD THEREFOR", and the content of the two is incorporated herein by reference in their entireties.

TECHNICAL FIELD

Embodiments of the present disclosure relate to the technical field of antennas, and in particular, to a silicon-based optical antenna with a reflective layer and a preparation method therefor.

BACKGROUND

The concept of phased array Lidar has long been proposed, and various design schemes are continuously being developed. Basic modules of the phased array Lidar, such as light source module, beam splitting module, and phase modulation module, are all mature, but how to efficiently emit light after being phase-modulated by each waveguide from a photonic integrated circuit is still a huge challenge. This is because the refractive index of the waveguide is much greater than that of air, and it is very difficult to couple the light from the waveguide into free space, resulting in that the emission efficiency of an optical antenna is extremely low. In addition, grating lobes formed due to an interference of the light coupled from each waveguide into the free space would seriously affect the performance of the optical antenna, resulting in that a scanning angle of a Lidar is greatly reduced.

At present, the optical antennas of phased array Lidar are mainly divided into the following two types: 1. metal dipole type optical antennas, and 2. non-metallic optical antennas. Among them, the working principle of the optical antennas of metal dipole type is that the light excites metal surface plasmon resonance to form near-field optical enhancement. However, since an effect of the near-field optical enhancement is very sensitive to a size of the metal, a wavelength of the light, and polarization, with a limiting outward radiating capacity, and there are many limitations for practical applications of the metal dipole type optical antennas, which are basically limited to the near field application. In addition, a substrate of metal nanoparticle type optical antennas is generally different from a substrate of standard complementary metal oxide semiconductor (CMOS) process, which is not conducive to large-scale integration. Non-metallic optical antennas are mainly the grating type optical antennas. With the development of photonic integration, the grating type optical antennas have become the most effective coupling method for photonic integration due to their advantages such as simple process, compatibility with CMOS processes, and the like. However, there are also many problems with the performance of the grating type optical antennas. For example, the light outward coupling from the grating on each waveguide is severely divergent, the radiation efficiency is extremely low, and energy of the grating lobes after interference is large, which is not well suppressed, and it is extremely disadvantageous for the scanning function of the Lidar.

SUMMARY

Embodiments of the present disclosure provide a silicon-based optical antenna with a reflective layer and a preparation method therefor, which are used to solve a problem of low radiation efficiency of grating type optical antennas in the prior art.

In one aspect, the present disclosure provides a silicon-based optical antenna with a reflective layer, including:
   a silicon-on-insulator (SOI) substrate, the SOI substrate at least comprises a bottom silicon layer, a buried oxide layer, and a top silicon layer, the buried oxide layer is located between the bottom silicon layer and the top silicon layer, the top silicon layer is etched to form a row of waveguides, spacings between the waveguides in the row of the waveguides are in an uneven distribution, each waveguide of the row of the waveguides is etched with gratings, the bottom silicon layer is formed with a groove directly reaching a surface of the buried oxide layer facing the bottom silicon layer, and the surface of the buried oxide layer in the groove is formed with a metal reflective layer.

In another aspect, an embodiment of the present disclosure provides a preparation method for a silicon-based optical antenna with a reflective layer, including:
   acquiring an SOI substrate, the SOI substrate at least including a bottom silicon layer, a buried oxide layer, and a top silicon layer;
   etching the top silicon layer to form a row of waveguides, and etching each waveguide of the row of the waveguides with gratings, wherein spacings between the waveguides in the row of the waveguides are in an uneven distribution;
   etching the bottom silicon layer to form a groove corresponding to a region where the gratings are located and directly reaching a surface of the buried oxide layer facing the bottom silicon layer, and forming a reflective surface on a surface of the buried oxide layer in the groove; and
   depositing a metal reflective layer on the reflective surface.

The silicon-based optical antenna based on the reflective layer and the preparation method therefor provided by the embodiments of the present disclosure, the radiation efficiency of the optical antenna is improved by forming a metal reflective layer between the silicon substrate layer and the buried oxide layer of the optical antenna.

DESCRIPTION OF EMBODIMENTS

In order to make the objects, technical solutions, and advantages of the embodiments of the present disclosure more clear, the technical solutions in the embodiments of the present disclosure will be clearly and completely described in combination with the accompanying drawings in the embodiments of the present disclosure. Obviously, the described embodiments are part of the embodiments of the present disclosure, but not all the embodiments. Based on the embodiments of the present disclosure, all other embodiments obtained by a person of ordinary skill in the art without creative efforts are within the protection scope of the present application.

Figure 1:
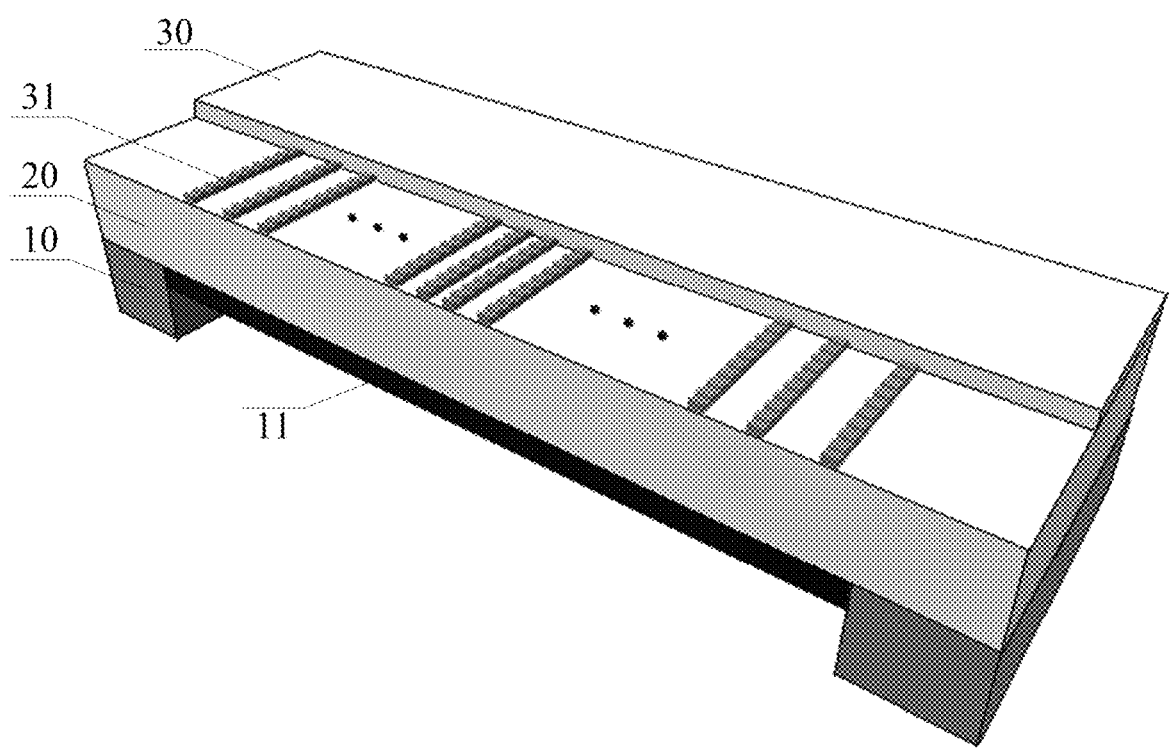
FIG. 1 is a schematic structural diagram of a silicon-based optical antenna with a reflective layer according to an embodiment of the present disclosure.

FIG. 1 is a schematic structural diagram of a silicon-based optical antenna with a reflective layer according to an embodiment of the present disclosure. As shown in FIG. 1, the optical antenna includes:

an SOI substrate, which at least includes a bottom silicon layer 10, a buried oxide layer 20, and a top silicon layer 30, where the buried oxide layer 20 is located between the bottom silicon layer 10 and the top silicon layer 30, the top silicon layer 30 of the SOI substrate is etched to form a row of waveguides, and each waveguide of the row of the waveguides is etched with gratings, and a metal reflecting layer 11 is formed at a region where the bottom silicon substrate 10 and the buried oxide layer 20 are in contact with each other.

Optical antennas are used to receive or emit optical waves, and can be applied to many optical devices, such as a phased array Lidar. The optical antenna may be an optical device integrated on a piece of CMOS semiconductor material, and one of the most commonly used CMOS semiconductor materials is the SOI substrate. The SOI substrate at least includes the bottom silicon layer 10, the buried oxide layer 20, and the top silicon layer 30 from bottom to top, and a material and thickness of each layer can be customized according to different requirements. Of course, some conventional SOI substrate products with standard CMOS process on the market can also be used, a material of the bottom silicon layer 10 is Si with a thickness of 500~600 μm, a material of the buried oxide layer 20 is $SiO_2$ with a thickness of 2 μm, and a material of the top silicon layer 30 is Si with a thickness of 220 nm or 340 nm. For convenience of description, in the following embodiments, the optical antenna of the embodiments of the present disclosure is integrated using the SOI substrate of the above-mentioned standard CMOS process as the SOI substrate, where the thickness of the top silicon layer 30 is 220 nm.

The top silicon layer 30 of the SOI substrate is etched to form the row of waveguides, and the row of waveguides may be a row of waveguides 31 arranged horizontally. A corresponding number of gratings need to be etched on each waveguide 31, and the gratings on all waveguides 31 are combined into a two-dimensional diffraction grating, thereby optical waves emitting from the waveguide 31 or emitting into the waveguide 31 can be implemented through the two-dimensional diffraction grating. For convenience of description, in all the following embodiments, the optical waves emitting from the two-dimensional diffraction grating is taken as an example.

Due to large differences between wavelengths of the optical waves, it is impossible that one kind of design of the optical antenna can adapt to all wavelengths of the optical waves. Even if a same design idea can be used, various parameters need to take corresponding changes according to different wavelengths of the optical waves emitted by the optical antenna. For convenience of description, in the following embodiments, the wavelength of the optical wave of 1.5~1.6 μm is taken as an example for description.

When the optical waves enter a region where the two-dimensional diffraction grating is located via the waveguides 31, refraction and reflection are formed on the gratings. Refracted optical waves will emit from the gratings and form coupling in free space, so as to achieve a purpose of the optical antenna emitting the optical waves. Also, a large quantity of reflected optical waves will pass through the underlying bottom silicon layer 10 and be lost, which is disadvantageous for the radiation efficiency of the entire optical antenna.

For this reason, in the embodiments of the present disclosure, the metal reflective layer 11 is formed at the region where the silicon substrate 10 and the buried oxide layer 20 of the SOI substrate are in contact with each other. The bottom silicon layer 10 may be etched with a rectangular groove by a deep etching method, directly reaching the region where the buried oxide layer 20 and the bottom silicon layer 10 are in contact with each other, and then a certain thickness of the metal reflective layer 11 is deposited in the rectangular groove. When the optical waves reflected by the gratings reach the metal reflective layer 11, the metal reflective layer will reflect the reflected optical waves back, so that more optical waves can enter the free space, to further coupling with the foregoing optical waves refracted into the free space through the gratings, which improves the radiation efficiency of the entire optical antenna.

The embodiments of the present disclosure improve the radiation efficiency of the optical antenna by forming the metal reflective layer 11 between the bottom silicon layer 10 and the buried oxide layer 20 of the optical antenna.

Based on the above embodiments, a region where the metal reflective layer 11 is located corresponds to the region where the gratings are located, and is larger than the region where the gratings are located.

When the optical antenna forms a metal reflective layer, it is necessary to determine the region and a size of the metal reflective layer firstly. Since the metal reflective layer is used to reflect the optical waves reflected by the grating, the metal reflective layer needs to correspond to the region where the gratings are located, that is, right under the two-dimensional diffraction grating. Also, considering an angle of the optical waves emitting, the region where the metal reflective layer is located further needs to be larger than the region where the gratings are located. For example, a side length of the metal reflective layer is 10~20 μm longer than a side length of the region where the gratings are located.

In some embodiments, the thickness of the metal reflective layer corresponds to a metal material of the metal reflective layer and the wavelengths of the optical waves emitted by the optical antenna.

Different metals have different absorption effects on optical waves in different wavelengths, and different thicknesses of the metal reflective layer will have different influences on reflection effects. For example, for the wavelength of 1.5~1.6 μm, if silver is used as the material to form the metal reflective layer, and if the thickness of the metal reflective layer is less than 100 nm, it will strongly absorb light. Therefore, when the material of the metal reflective layer is silver, its thickness needs to be greater than 100 nm. When the thickness of the metal reflective layer using silver as the material is 220 nm, the radiation efficiency of the designed optical antenna can be up to 72%. For another example, if the metal reflective layer is formed using gold as the material, it will be found that its absorption effect for the optical waves of the wavelength of 1.5~1.6 μm is stronger than double that of the metal reflective layer formed using silver as the material. The metal material forming the metal reflective layer is not limited herein, and it can be specifically designed according to specific conditions and requirements.

By analyzing the region, size, material, and thickness of the metal reflective layer, the embodiments of the present disclosure can form a metal reflective layer more suitable for the current wavelengths of the optical waves, thereby further improving the radiation efficiency of the optical antenna.

Based on the above embodiment, the row of waveguides may be a row of waveguides arranged horizontally.

When etching the top silicon layer of the SOI substrate to form the row of waveguides, the row of waveguides may be a row of waveguides arranged horizontally. There are multiple arrangement ways for the row of waveguides, such as a uniform arrangement, that is, spacings between adjacent waveguides are the same. The uniform arrangement is the simplest and most convenient, but it brings defects such as high grating lobes and large far-field divergence angle. The waveguide arrangement way in the embodiments of the present disclosure adopts an uneven arrangement, that is, spacings between adjacent waveguides are different, so as to overcome defects such as high grating lobes and large far-field divergence angle. In some embodiments, spacings between the waveguides of the row of waveguides may be in an uneven spacing distribution, such as a Gaussian distribution, an arithmetic distribution, or a geometric distribution.

In some embodiments, spacings between the waveguides are in a Gaussian distribution is that, in the row of waveguides formed by the horizontally arranged waveguides, a spacing between two adjacent waveguides 31 will be different with their different positions in the row of waveguides, and the spacings in the center are denser and the spacings in both sides are sparser, that is, a spacing between two adjacent waveguides 31 of the waveguides on both sides of the row of waveguides is greater than a spacing between two adjacent waveguides 31 of the waveguides 31 in center, and according to the Gaussian distribution, the closer to the center of the row of waveguides, the smaller a spacing between two adjacent waveguides 31, especially a distance between two adjacent waveguides 31 located at the center is smallest. A spacing between two adjacent waveguides 31 closer to the both sides of the row of waveguides will become wider. For example, the row of waveguides consists of a total of thirty-two lines of waveguides 31, a minimum spacing between the two waveguides 31 in the middle is 1.35 μm, and a maximum spacing between outermost adjacent waveguides is 2.34 μm.

In some embodiments, due to that the refractive index of silicon for the wavelength of 1.5~1.6 μm is about 3.47, the diffraction limit problem of the waveguide design, and a minimum width of the waveguide needs to be greater than an effective half-wavelength of a propagation mode in the waveguide, so that the width of the waveguide of the optical antenna may be designed to be 400~600 nm.

In some embodiments, the optical antenna needs to be connected to a bent waveguide, and a waveguide structure of the optical antenna needs to be consistent with the bent waveguide. In order to minimize the loss, the waveguide may be etched using a full etching method, that is, when the thickness of the top silicon layer of the SOI substrate is 220 nm, an etching depth of the waveguide is 220 nm, and the thickness of the waveguide is 220 nm. This waveguide structure can minimize the bending loss of the front-end bent waveguide and minimize the energy leaked by the waveguide bending.

In some embodiments, when gratings are etched on the waveguides, a grating period needs to be determined first, and then positions of each grating are determined according to the grating period. Since the wavelength of the optical wave $\lambda_0$ is 1.5~1.6 μm, the effective refractive index $n_{eff}$ of the row of waveguides for this wavelength is about 2.38. According to a formula of the two-dimensional diffraction grating, $\Lambda=\lambda_0/n_{eff}$, the period $\Lambda$ of the two-dimensional diffraction grating is obtained to be 600~680 nm, that is, the gratings are etched uniformly on the waveguides with a spacing between two adjacent waveguides as each grating period $\Lambda$. In some embodiments, a width of the gratings is determined by a duty cycle, where the duty cycle refers to a ratio of the width of the grating to the grating period. It can be known from calculation that, when the wavelength of the optical wave is 1.5~1.6 μm and the duty cycle of the two-dimensional diffraction grating is 0.4~0.6, the outward radiation efficiency is highest. Therefore, the width of the gratings 32 can be determined according to the wavelength of the optical wave of 1.5~1.6 μm and the duty ratio of the two-dimensional diffraction grating of 0.4~0.6.

In some embodiments, in order to obtain a small far-field divergence angle along a direction of the waveguides and a high longitudinal scanning resolution, the two-dimensional diffraction grating of the optical antenna can be designed with a shallow etching depth of 20~70 nm, while the two-dimensional diffraction grating has a longer area of 80~100 μm.

Figure 2:
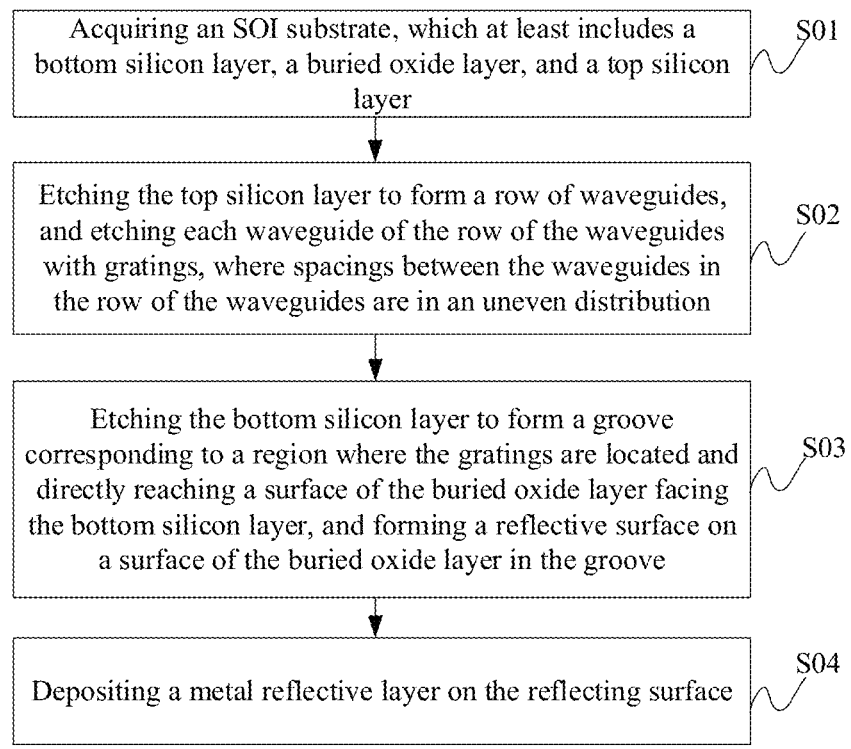
FIG. 2 is a schematic flowchart of a preparation method for a silicon-based optical antenna with a reflective layer according to an embodiment of the present disclosure.
Figure 3:
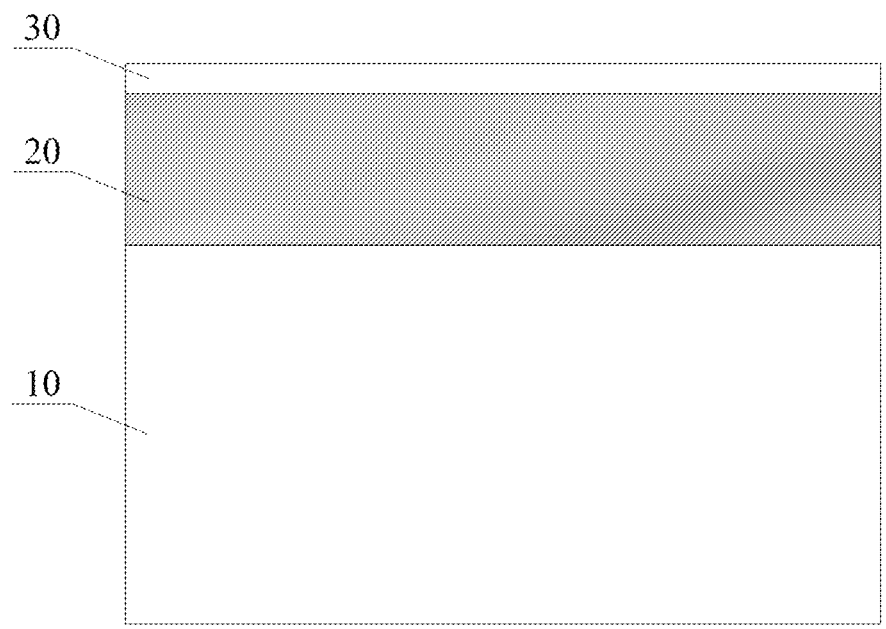
FIG. 3 is a schematic structural diagram of an SOI substrate according to an embodiment of the present disclosure.
Figure 4:
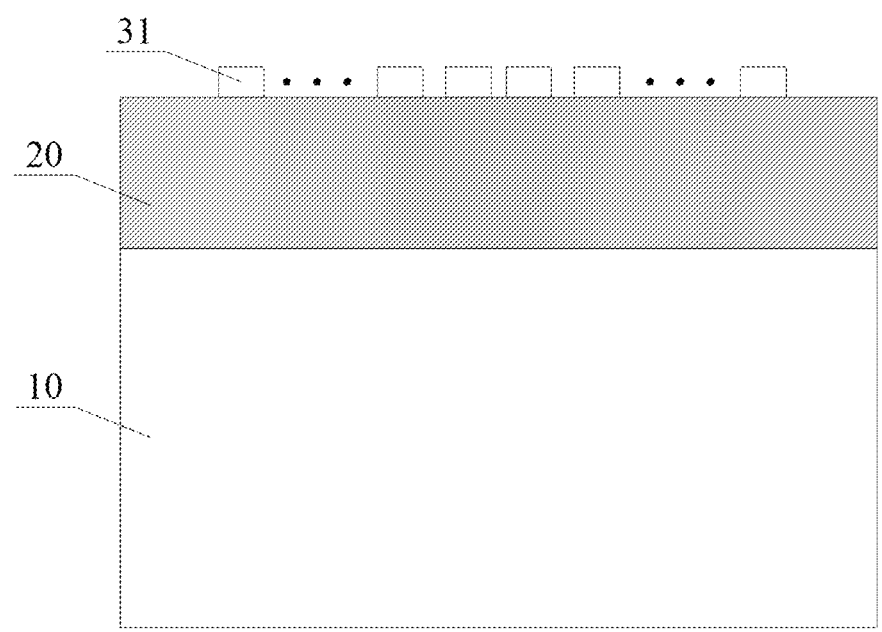
FIG. 4 is a schematic structural diagram of an SOI substrate according to another embodiment of the present disclosure.
Figure 5:
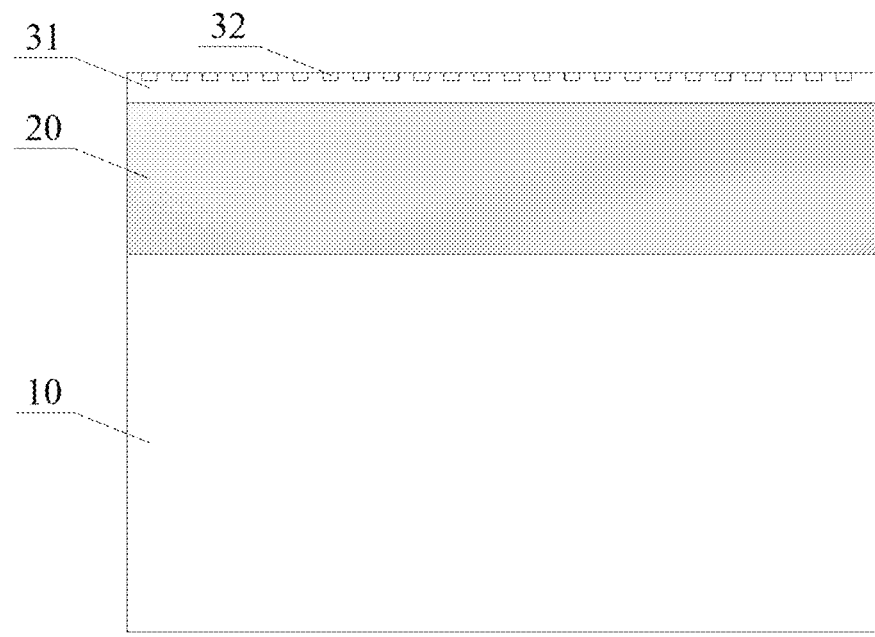
FIG. 5 is a schematic structural diagram of an SOI substrate according to still another embodiment of the present disclosure.
Figure 6:
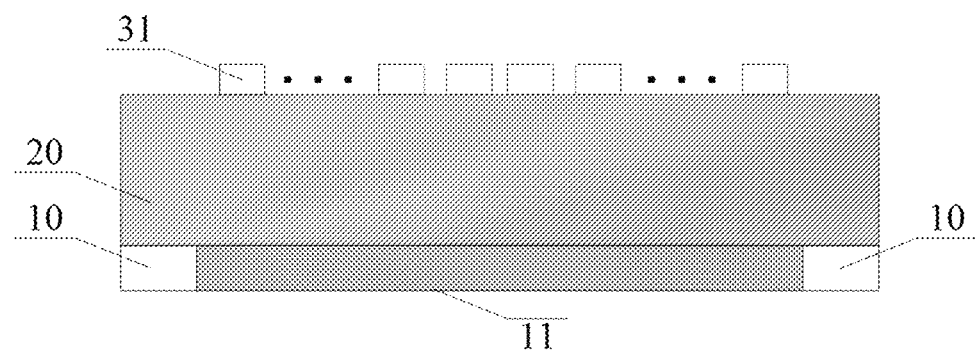
FIG. 6 is a schematic structural diagram of an SOI substrate according to yet another embodiment of the present disclosure.

FIG. 2 is a schematic flowchart of a method for preparing a silicon-based optical antenna with a reflective layer according to an embodiment of the present disclosure, FIG. 3 is a schematic structural diagram of an SOI substrate according to an embodiment of the present disclosure, FIG. 4 is a schematic structural diagram of an SOI substrate according to another embodiment of the present disclosure, FIG. 5 is a schematic structural diagram of an SOI substrate according to still another embodiment of the present disclosure, and FIG. 6 is a schematic structural diagram of an SOI substrate according to yet another embodiment of the present disclosure. As shown in FIG. 2, the preparation method may include steps S01 to S04.

Step S01, acquiring an SOI substrate, which at least includes a bottom silicon layer, a buried oxide layer, and a top silicon layer.

As shown in FIG. 3, an SOI substrate is acquired, and the SOI substrate at least includes a bottom silicon layer 10, a buried oxide layer 20, and a top silicon layer 30 from bottom to top, and a material and thickness of each layer can be customized according to different requirements. Of course, some conventional SOI substrate products with standard CMOS process on the market can also be used, a material of the bottom silicon layer 10 is Si with a thickness of 500~600 μm, a material of the buried oxide layer 20 is $SiO_2$ with a thickness of 2 μm, and a material of the top silicon layer 30 is Si with a thickness of 220 nm or 340 nm. For convenience of description, in the following embodiments, the optical antenna of the embodiments of the present disclosure is integrated using the SOI substrate of the above-mentioned standard CMOS process as the SOI substrate, where the thickness of the top silicon layer 30 is 220 nm.

Step S02, etching the top silicon layer to form a row of waveguides, and etching each waveguide of the row of the waveguides with gratings, where spacings between the waveguides in the row of the waveguides are in an uneven distribution.

As shown in FIG. 4 and FIG. 5, on the SOI substrate, the top silicon layer 30 of the SOI substrate is etched to form a row of waveguides. Among them, there are many methods used for etching, such as using electron beam exposure etching, step-lithography, or inductively coupled plasma (ICP) etching. A row of waveguides of the same size is etched on the top silicon layer 30, and the row of waveguides may be a row of waveguides 31 arranged horizontally.

In some embodiments, when the top silicon layer 30 of the SOI substrate is etched to form the row of waveguides, the arrangement ways of the row of waveguides may be a uniform arrangement, and may also be an uneven arrangement. The waveguide arrangement way in the embodiments of the present disclosure adopts an uneven arrangement, that is, spacings between adjacent waveguides are different, so as to overcome defects such as high grating lobes and large far-field divergence angle. In some embodiments, spacings between the waveguides of the row of waveguides may be in an uneven spacing distribution, such as in a Gaussian distribution, an arithmetic distribution, or a geometric distribution.

In some embodiments, spacings between the waveguides are in a Gaussian distribution is that, in the row of waveguides formed by the horizontally arranged waveguides, a spacing between two adjacent waveguides 31 will be different with their different positions in the row of waveguides, and the spacings in the center are denser and the spacings in both sides are sparser, that is, a spacing between two adjacent waveguides 31 of the waveguides on both sides of the row of waveguides is greater than a spacing between two adjacent waveguides 31 of the waveguides 31 in center, and according to the Gauss distribution, the closer to the center of the row of waveguides, the smaller a spacing between two adjacent waveguides 31, especially a distance between two adjacent waveguides 31 located at the center is smallest. A spacing between two adjacent waveguides 31 closer to the both sides of the row of waveguides will become wider. For example, the row of waveguides consists of a total of thirty-two lines of waveguides 31, a minimum spacing between the two waveguides 31 in the middle is 1.35 μm, and a maximum spacing between outermost adjacent waveguides is 2.34 μm.

In some embodiments, gratings 32 may be etched on each waveguide 31 by using an electron beam etching and an ICP etching method to form a two-dimensional diffraction grating.

The optical waves emitting from or emitting into the waveguide 31 can be implemented through the two-dimensional diffraction grating. For convenience of description, in the following embodiments, the optical waves emitting from the two-dimensional diffraction grating is taken as an example.

Step S03: etching the bottom silicon layer to form a groove corresponding to a region where the gratings are located and directly reaching a surface of the buried oxide layer facing the bottom silicon layer, and forming a reflective surface on a surface of the buried oxide layer in the groove.

Through a deep etching method, such as photolithography and ICP deep etching, a rectangular groove is etched in the bottom silicon layer 10, and the etching stops at the lower surface of the buried oxide layer 20, so that a reflective surface is formed at the lower surface of the buried oxide layer 20.

Since the thickness of the bottom silicon layer 10 of the SOI substrate of the standard CMOS process reaches 500~600 μm, it is very difficult to etch the groove by directly using the etching method, therefore, before the etching, polishing on the bottom silicon layer 10 is further included. For example, chemical mechanical polish (CMP) is used to reduce the thickness of the bottom silicon layer 10 to 50~100 μm. Then, an etching method is used to form the reflective surface.

Step S04, depositing a metal reflective layer on the reflecting surface.

As shown in FIG. 6, a metal thin film is deposited on the reflective surface, for example, the metal thin film can be deposited by a magnetron sputtering method to form the metal reflective layer.

When the optical waves enter a region where the two-dimensional diffraction grating is located via the waveguide 31, refraction and reflection happen on the gratings. Refracted optical waves will emit from the gratings and couple into free space, so as to achieve a purpose of the optical antenna emitting the optical waves. Also, a large quantity of reflected optical waves will pass through the underlying bottom silicon layer 10 and be lost, which is disadvantageous for the radiation efficiency of the entire optical antenna.

The preparation method provided by the embodiment of the present disclosure is used to make the above-mentioned optical antenna, and for its structure and function, reference may be specifically made to the above-mentioned embodiment of the optical antenna, details are not described herein again.

The embodiments of the present disclosure improve the radiation efficiency of the optical antenna by forming the metal reflective layer 11 at a region where the bottom silicon layer 10 and the buried oxide layer 20 of the optical antenna are in contact with each other.

In some embodiments, the region covered by the metal reflective layer is larger than the region where the corresponding gratings are located.

When a rectangular groove is etched into the bottom silicon layer by a deep etching method, the rectangular groove, that is, the reflective surface, and the region and size of the metal reflective layer need to be determined first. Since the metal reflective layer is used to reflect the optical waves reflected by the grating, the metal reflective layer needs to correspond to the region where the gratings are located, that is, right under the two-dimensional diffraction grating. Also, considering an angle of the optical waves emitting, the region where the metal reflective layer is located further needs to be larger than the region where the gratings are located. For example, a side length of the metal reflective layer is 10~20 μm longer than a side length of the region where the gratings are located.

In some embodiments, the thickness of the metal reflective layer corresponds to the metal material of the metal reflective layer and the wavelength of the optical wave emitted by the optical antenna.

Different metals have different absorption effects on optical waves in different wavelengths, and different thicknesses of the metal reflective layer will have different influences on the reflection effects. For example, for the wavelength of 1.5~1.6 μm, if silver is used as the material to form the metal reflective layer, and if the thickness of the metal reflective layer is less than 100 nm, it will strongly absorb light. Therefore, when the material of the metal reflective layer is silver, its thickness needs to be greater than 100 nm. When the thickness of the metal reflective layer using silver as the material is 220 nm, the radiation efficiency of the designed optical antenna can be up to 72%. For another example, if the metal reflective layer is formed using gold as the material, it will be found that its absorption effect for the optical waves of the wavelength of 1.5~1.6 μm is stronger more than double that of the metal reflective layer formed using silver as the material. The metal material forming the metal reflective layer is not limited herein, and it can be specifically designed according to specific conditions and requirements.

The preparation method provided by the embodiments of the present disclosure is used to make the above-mentioned optical antenna, for its structure and function, reference may be made to the above-mentioned embodiment of the optical antenna, and details are not described herein again.

By analyzing the region, size, material, and thickness of the metal reflective layer, the embodiments of the present disclosure can form a metal reflective layer more suitable for the current wavelength of the optical wave, thereby further improving the radiation efficiency of the optical antenna.

Based on the above embodiments, further, the preparation method may further include:

growing a silicon dioxide ($SiO_2$) protecting layer over the region where the gratings are located.

In order to further protect the optical antenna, a $SiO_2$ protecting layer may be covered over the optical antenna, that is, over the region where the two-dimensional diffraction grating is located. There are many methods, for example, plasma enhanced chemical vapor deposition (PECVD) can be used to grow a $SiO_2$ protecting layer with a thickness of 1~3 μm over the grating region, so that the optical antenna is protected when other processes are performed on the SOI substrate where the optical antenna is located.

The preparation method provided by the embodiment of the present disclosure is used to obtain the above-mentioned optical antenna, for its structure and function, reference may be made to the above-mentioned embodiments of the optical antenna, and details are not described herein again.

In the embodiments of the present disclosure, the $SiO_2$ protecting layer is covered on the optical antenna, thereby facilitating integrated operations of the optical antenna and other devices, and protecting the optical antenna.

Based on the above embodiments, the row of waveguides may be a row of waveguides arranged horizontally.

In some embodiments, the row of waveguides includes multiple waveguides arranged in a horizontal plane and arranged in parallel.

When the top silicon layer of the SOI substrate is etched to form the row of waveguides, a waveguide shape and arrangement way of the row of waveguides need to be determined first.

Since the refractive index of silicon for the wavelength of 1.5~1.6 μm is about 3.47, the diffraction limit problem of the waveguide 31 design, and a minimum width of the waveguide needs to be greater than an effective half-wavelength of a propagation mode in the waveguide 31, so that the width of the waveguide of the optical antenna can be designed to be 400~600 nm. For convenience of description, in the following embodiments, the wavelength of the optical wave emitted by the optical antenna of 1.5~1.6 μm is taken as an example.

In some embodiments, the optical antenna needs to be connected to a bent waveguide, and a waveguide structure of the optical antenna needs to be consistent with the bent waveguide. In order to minimize the loss, the waveguides may be etched using a full etching method, that is, when the thickness of the top silicon layer of the SOI substrate is 220 nm, an etching depth of the waveguide is 220 nm, and the thickness of the waveguide is 220 nm. This waveguide structure can minimize the bending loss of the front-end bent waveguide and minimize the energy leaked by the waveguide bending.

In some embodiments, when the gratings are etched on a waveguide, a grating period needs to be determined first, and then positions of each grating are determined according to the grating period. Since the wavelength of the optical wave $\lambda_0$ is 1.5~1.6 μm, the effective refractive index $n_{eff}$ of the row of waveguides for this wavelength is about 2.38. According to the two-dimensional diffraction grating formula $\Lambda=\lambda_0/n_{eff}$, the period $\Lambda$ of the two-dimensional diffraction grating is obtained to be 600~680 nm, that is, the gratings are etched uniformly on the waveguides with a spacing between adjacent waveguides as each grating period $\Lambda$. In some embodiments, a width of the grating is determined by a duty cycle, where the duty cycle refers to a ratio of the width of the grating to the grating period.

It can be known from calculation that, when the wavelength of the optical wave is 1.5~1.6 μm and the duty cycle of the two-dimensional diffraction grating is 0.4~0.6, the outward radiation efficiency is highest. Therefore, the width of the gratings 32 may be determined according to the wavelength of the optical wave of 1.5~1.6 μm and the duty ratio of the two-dimensional diffraction grating of 0.4~0.6.

In some embodiments, in order to obtain a small far-field divergence angle along a direction of the waveguide and a high longitudinal scanning resolution, the two-dimensional diffraction grating of the optical antenna can be designed with a shallow etching depth of 20~70 nm, while the two-dimensional diffraction grating has a longer area of 80~100 μm.

The preparation method provided by the embodiment of the present disclosure is used to make the above-mentioned optical antenna. For its structure and function, reference may be made to the above-mentioned embodiment of the optical antenna, and details are not described herein again.

In the embodiments of the present disclosure, the waveguide in the optical antenna adopts a shallow etching grating method, so that when the optical wave passes through the combined two-dimensional diffraction grating, a small far-field divergence angle, a high grating lobes suppression effect, and a high horizontal and longitudinal scanning resolution can be acquired. Taking the number of waveguides of the optical antenna as thirty-two as an example, the far-field divergence angle along a direction perpendicular to the waveguide is less than 2°, and a grating lobes suppression ratio is 6.81 dB, which can achieve a horizontal direction (that is, the direction perpendicular to the waveguide) scan range of ±40°, and a longitudinal direction (that is, a direction along the waveguide) scan range of ±10°. If the number of waveguides of the optical antenna is larger, the far-field characteristics of the optical antenna are better.

In an embodiment of the present disclosure, as shown in FIG. 1, the optical antenna includes:

an SOI substrate, which at least includes a bottom silicon layer 10, a buried oxide layer 20, and a top silicon layer 30, where the buried oxide layer 20 is located between the bottom silicon layer 10 and the top silicon layer 30, the top silicon layer 30 of the SOI substrate is etched to form a row of waveguides, and each waveguide of the row of waveguides is etched with gratings, the bottom silicon layer 10 of the SOI substrate is formed with a groove directly reaching a surface of the buried oxide layer 20 facing the bottom silicon layer 10, and the surface of the buried oxide layer 20 in the groove is formed with a metal reflective layer 11.

Optical antennas are used to receive or emit optical waves, and can be applied to many optical devices, such as phased array Lidar. The optical antenna may be an optical device integrated on a piece of CMOS semiconductor material, and one of the most commonly used CMOS semiconductor materials is the SOI substrate. The SOI substrate at least includes the bottom silicon layer 10, the buried oxide layer 20, and the top silicon layer 30 from bottom to top, and a material and thickness of each layer can be customized according to different requirements. Of course, some conventional SOI substrate products with standard CMOS process on the market can also be used, a material of the bottom silicon layer 10 is Si with a thickness of 500~600 μm, a material of the buried oxide layer 20 is $SiO_2$ with a thickness of 2 μm, and a material of the top silicon layer 30 is Si with a thickness of 220 nm or 340 nm. For convenience of description, in the following embodiments, the optical antenna of the embodiment of the present disclosure is integrated using the SOI substrate of the above-mentioned standard CMOS process as the SOI substrate, where the thickness of the top silicon layer 30 is 220 nm.

The top silicon layer 30 of the SOI substrate is etched to form the row of waveguides, and the row of waveguides may be a row of waveguides 31 arranged horizontally. A corresponding number of gratings need to be etched on each waveguide 31, and the gratings on all waveguides 31 are combined into a two-dimensional diffraction grating, thereby optical waves emitting from the waveguide 31 or emitting into the waveguide 31 can be implemented through the two-dimensional diffraction grating. For convenience of description, in the following embodiments, the optical waves emitting from the two-dimensional diffraction grating is taken as an example.

Due to large differences between wavelengths of the optical waves, it is impossible that one design of the optical antenna can meet all the uses of the wavelengths of the optical waves. Even if a same design idea can be used, various parameters need to take corresponding changes according to different wavelengths of the optical waves emitted by the optical antenna. For convenience of description, in the following embodiments, the wavelength of the optical wave of 1.5~1.6 μm that is taken as an example for description.

When the optical waves enter a region where the two-dimensional diffraction grating is located via the waveguides 31, refraction and reflection are formed on the gratings. Refracted optical waves will emit from the gratings and form coupling in free space, so as to achieve a purpose of the optical antenna emitting the optical waves. Also, a large quantity of reflected optical waves will pass through the underlying bottom silicon layer 10 and be lost, which is disadvantageous for the radiation efficiency of the entire optical antenna.

For this reason, in the embodiments of the present disclosure, the metal reflective layer 11 is formed at the region where the silicon substrate 10 and the buried oxide layer 20 of the SOI substrate are in contact with each other. The bottom silicon layer 10 may be etched with a rectangular groove by a deep etching method, directly reaching the region where the buried oxide layer 20 and the bottom silicon layer 10 are in contact with each other, and then a certain thickness of the metal reflective layer 11 is deposited in the rectangular groove. When the optical waves reflected by the gratings reach the metal reflective layer 11, the metal reflective layer will reflect the reflected optical waves back, so that more optical waves can enter the free space, to further coupling with the foregoing optical waves refracted into the free space through the gratings, which improves the radiation efficiency of the entire optical antenna.

The embodiments of the present disclosure improve the radiation efficiency of the optical antenna by forming the metal reflective layer 11 between the bottom silicon layer 10 and the buried oxide layer 20 of the optical antenna.

Based on the above embodiments, a region where the metal reflective layer 11 is located corresponds to the region where the gratings are located, and is larger than the region where the gratings are located.

When the optical antenna forms a metal reflective layer, it is necessary to determine the region and a size of the metal reflective layer firstly. Since the metal reflective layer is used to reflect the optical waves reflected by the grating, the metal reflective layer needs to correspond to the region where the gratings are located, that is, right under the two-dimensional diffraction grating. Also, considering an angle of the optical waves emitting, the region where the metal reflective layer is located further needs to be larger than the region where the gratings are located. For example, a side length of the metal reflective layer is 10~20 μm longer than a side length of the region where the gratings are located.

In some embodiments, the thickness of the metal reflective layer corresponds to a metal material of the metal reflective layer and the wavelengths of the optical waves emitted by the optical antenna.

Different metals have different absorption effects on optical waves in different wavelengths, and different thicknesses of the metal reflective layer will have different influences on reflection effects. For example, for the wavelength of 1.5~1.6 μm, if silver is used as the material to form the metal reflective layer, and if the thickness of the metal reflective layer is less than 100 nm, it will strongly absorb light. Therefore, when the material of the metal reflective layer is silver, its thickness needs to be greater than 100 nm. When the thickness of the metal reflective layer using silver as the material is 220 nm, the radiation efficiency of the designed optical antenna can be up to 72%. For another example, if the metal reflective layer is formed using gold as the material, it will be found that its absorption effect for the optical waves of the wavelength of 1.5~1.6 μm is stronger than double that of the metal reflective layer formed using silver as the material. The metal material forming the metal reflective layer is not limited herein, and it can be specifically designed according to specific conditions and requirements.

By analyzing the region, size, material, and thickness of the metal reflective layer, the embodiments of the present disclosure can form a metal reflective layer more suitable for the current wavelengths of the optical waves, thereby further improving the radiation efficiency of the optical antenna.

Based on the above embodiment, the row of waveguides may be a row of waveguides arranged horizontally.

In some embodiments, the row of waveguides may include multiple waveguides in a horizontal plane and arranged in parallel.

When etching the top silicon layer of the SOI substrate to form the row of waveguides, the row of waveguides may be a row of waveguides arranged horizontally, including multiple waveguides in a horizontal plane and arranged in parallel. There are multiple arrangement ways for the row of waveguides, including but not limited to a uniform arrangement, that is, spacings between adjacent waveguides are the same. The uniform arrangement is the simplest and most convenient, but it brings defects such as high grating lobes and large far-field divergence angle.

The waveguide arrangement way in the embodiments of the present disclosure adopts an uneven arrangement, that is, spacings between adjacent waveguides are different, so as to overcome defects such as high grating lobes and large far-field divergence angle. In some embodiments, spacings between the waveguides of the row of waveguides may be in an uneven spacing distribution, such as a Gaussian distribution, an arithmetic distribution, or a geometric distribution.

In some embodiments, spacings between the waveguides are in a Gaussian distribution is that, in the row of waveguides formed by the horizontally arranged waveguides, a spacing between two adjacent waveguides 31 will be different with their different positions in the row of waveguides, and the spacings in the center are denser and the spacings in both sides are sparser, that is, a spacing between two adjacent waveguides 31 of the waveguides on both sides of the row of waveguides is greater than a spacing between two adjacent waveguides 31 of the waveguides 31 in center, and according to the Gauss distribution, the closer to the center of the row of waveguides, the smaller a spacing between two adjacent waveguides 31, especially a distance between two adjacent waveguides 31 located at the center is smallest. A spacing between two adjacent waveguides 31 closer to the both sides of the row of waveguides will become wider. For example, the row of waveguides consists of a total of thirty-two lines of waveguides 31, a minimum spacing between the two waveguides 31 in the middle is 1.35 μm, and a maximum spacing between outermost adjacent waveguides is 2.34 μm.

In some embodiments, due to that the refractive index of silicon for the wavelength of 1.5~1.6 μm is about 3.47, the diffraction limit problem of the waveguide design, and a minimum width of the waveguide needs to be greater than an effective half-wavelength of a propagation mode in the waveguide, so that the width of the waveguide of the optical antenna may be designed to be 400~600 nm.

In some embodiments, the optical antenna needs to be connected to a bent waveguide, and a waveguide structure of the optical antenna needs to be consistent with the bent waveguide. In order to minimize the loss, the waveguide may be etched using a full etching method, that is, when the thickness of the top silicon layer of the SOI substrate is 220 nm, an etching depth of the waveguide is 220 nm, and the thickness of the waveguide is 220 nm. This waveguide structure can minimize the bending loss of the front-end bent waveguide and minimize the energy leaked by the waveguide bending.

In some embodiments, when gratings are etched on the waveguides, a grating period needs to be determined first, and then positions of each grating are determined according to the grating period. Since the wavelength of the optical wave $\lambda_0$ is 1.5~1.6 μm, the effective refractive index $n_{eff}$ of the row of waveguides for this wavelength is about 2.38.

According to a formula of the two-dimensional diffraction grating, $\Lambda=\lambda_0/n_{eff}$, the period $\Lambda$ of the two-dimensional diffraction grating is obtained to be 600~680 nm, that is, the gratings are etched uniformly on the waveguides with a spacing between two adjacent waveguides as each grating period $\Lambda$. In some embodiments, a width of the gratings is determined by a duty cycle, where the duty cycle refers to a ratio of the width of the grating to the grating period. It can be known from calculation that, when the wavelength of the optical wave is 1.5~1.6 μm and the duty cycle of the two-dimensional diffraction grating is 0.4~0.6, the outward radiation efficiency is highest. Therefore, the width of the gratings 32 can be determined according to the wavelength of the optical wave of 1.5~1.6 μm and the duty ratio of the two-dimensional diffraction grating of 0.4~0.6.

In some embodiments, in order to obtain a small far-field divergence angle along a direction of the waveguides and a high longitudinal scanning resolution, the two-dimensional diffraction grating of the optical antenna can be designed with a shallow etching depth of 20~70 nm, while the two-dimensional diffraction grating has a longer area of 80~100 μm.

Finally, it should be noted that the above embodiments are merely intended for describing, rather than limiting, the technical solutions of the present disclosure; although the present disclosure has been described in detail with reference to the foregoing various embodiments, those skilled in the art will understand that they may still make modifications to the technical solutions described in the foregoing various embodiments, or make equivalent substitutions to some or all of the technical features therein; and these modifications or substitutions do not make the essence of the corresponding technical solutions deviate from the scope of the technical solutions in the various embodiments of the present disclosure.

What is claimed is:

1. A silicon-based optical antenna with a reflective layer, wherein the optical antenna comprises: a silicon-on-insulator (SOI) substrate, the SOI substrate at least comprises a bottom silicon layer, a buried oxide layer, and a top silicon layer, the buried oxide layer is located between the bottom silicon layer and the top silicon layer, the top silicon layer is etched to form a row of waveguides, spacings between the waveguides in the row of the waveguides are in an uneven distribution, each waveguide of the row of the waveguides is etched with gratings, the bottom silicon layer is formed with a groove directly reaching a surface of the buried oxide layer facing the bottom silicon layer, and the surface of the buried oxide layer in the groove is formed with a metal reflective layer;

the gratings on the waveguides are combined into a two-dimensional diffraction grating; when optical waves enter a region where the two-dimensional diffraction grating is located, refraction and reflection are formed on the gratings, wherein refracted optical waves emit from the gratings and form coupling in a free space; when the optical waves reflected by the gratings reach the metal reflective layer, the optical waves are reflected back by the metal reflective layer, so that the optical waves enter the free space, to further coupling with the foregoing optical waves refracted into the free space.

2. The optical antenna according to claim 1, wherein a region where the metal reflective layer is located corresponds to a region where the gratings are located and is larger than the region where the gratings are located.

3. The optical antenna according to claim 1, wherein a thickness of the metal reflective layer corresponds to a metal material of the metal reflective layer and a wavelength emitted by the optical antenna.

4. The optical antenna according to claim 1, wherein the row of waveguides is a row of waveguides arranged horizontally.

5. The optical antenna according to claim 1, wherein the row of waveguides comprises multiple waveguides in a horizontal plane and arranged in parallel.

6. The optical antenna according to claim 1, wherein the spacings between the waveguides in the row of the waveguides are in an Gaussian distribution, wherein the spaces between the waveguides in a center of the row of the waveguides are denser, and the spaces between the waveguides in both sides of the row of the waveguides are sparser.

7. A preparation method for a silicon-based optical antenna with a reflective layer, comprising:
  acquiring a silicon-on-insulator (SOI) substrate, the SOI substrate at least comprising a bottom silicon layer, a buried oxide layer, and a top silicon layer;
  etching the top silicon layer to form a row of waveguides, and etching each waveguide of the row of the waveguides with gratings, wherein spacings between the waveguides in the row of the waveguides are in an uneven distribution;
  etching the bottom silicon layer to form a groove corresponding to a region where the gratings are located and directly reaching a surface of the buried oxide layer facing the bottom silicon layer, and forming a reflective surface on a surface of the buried oxide layer in the groove; and
  depositing a metal reflective layer on the reflective surface;
  wherein, the gratings on the waveguides are combined into a two-dimensional diffraction grating; when optical waves enter a region where the two-dimensional diffraction grating is located, refraction and reflection are formed on the gratings, wherein refracted optical waves emit from the gratings and form coupling in a free space; when the optical waves reflected by the gratings reach the metal reflective layer, the optical waves are reflected back by the metal reflective layer, so that the optical waves enter the free space, to further coupling with the foregoing optical waves refracted into the free space.

8. The preparation method according to claim 7, wherein a region covered by the metal reflective layer is larger than a corresponding region where the gratings are located.

9. The preparation method according to claim 7, wherein a thickness of the metal reflective layer corresponds to a metal material of the metal reflective layer and a wavelength emitted by the optical antenna.

10. The preparation method according to claim 7, further comprising:
  growing a $SiO_2$ protective layer on the region where the gratings of the SOI substrate are located.

11. The preparation method according to claim 7, wherein the row of the waveguides is a row of waveguides arranged horizontally.

12. The preparation method according to claim 7, wherein the row of the waveguides comprises multiple waveguides in a horizontal plane and arranged in parallel.

13. The preparation method according to claim 7, wherein the spacings between the waveguides in the row of the waveguides are in an Gaussian distribution, wherein the spaces between the waveguides in a center of the row of the waveguides are denser, and the spaces between the waveguides in both sides of the row of the waveguides are sparser.

* * * * *